United States Patent
Takesita et al.

[11] Patent Number: 5,836,380
[45] Date of Patent: Nov. 17, 1998

[54] HEATER/COOLER UNIT OF AUTOMOTIVE AIR CONDITIONING DEVICE

[75] Inventors: Norimitsu Takesita; Masahiro Sano, both of Sano; Yasuko Arakawa, Fujioka; Kazue Ayabe, Iwafune, all of Japan

[73] Assignee: Calsonic Corporation, Tokyo, Japan

[21] Appl. No.: 720,329

[22] Filed: Sep. 27, 1996

[30] Foreign Application Priority Data

Oct. 2, 1995 [JP] Japan ..................................... 7-254905
Oct. 2, 1995 [JP] Japan ..................................... 7-254906

[51] Int. Cl.$^6$ ..................................................... F25B 29/00
[52] U.S. Cl. ....................... 165/43; 165/42; 237/12.3 A; 237/12.3 B
[58] Field of Search .................. 165/42, 43; 237/12.3 A, 237/12.3 B

[56] References Cited

U.S. PATENT DOCUMENTS

| | | | |
|---|---|---|---|
| 4,108,376 | 8/1978 | Matsuda et al. | 237/12.3 B |
| 4,223,720 | 9/1980 | d'Orsay | 165/43 |
| 4,383,642 | 5/1983 | Sumikawa et al. | 165/42 |
| 4,406,214 | 9/1983 | Sakurai | 237/12.3 A |
| 5,012,859 | 5/1991 | Nakazawa et al. | 165/43 |

FOREIGN PATENT DOCUMENTS

| | | | |
|---|---|---|---|
| 3229866 | 2/1984 | Germany | 165/43 |
| 57-134318 | 8/1982 | Japan | 165/43 |
| 57-175418 | 10/1982 | Japan | 165/43 |
| 57-182514 | 11/1982 | Japan | 165/42 |
| 57-209415 | 12/1982 | Japan | 165/42 |
| 61-150815 | 7/1986 | Japan | 165/42 |
| 61-226314 | 10/1986 | Japan | 165/42 |
| 56-8712 | 1/1991 | Japan . | |
| 124362 | 10/1989 | Taiwan . | |
| 884918 | 12/1961 | United Kingdom | 165/42 |

*Primary Examiner*—John K. Ford
*Attorney, Agent, or Firm*—Foley & Lardner

[57] ABSTRACT

A heater/cooler unit of an automotive air conditioning device comprises a casing which has air inlet and outlet openings. An air mixing chamber is located just upstream of the air outlet opening. A first air flow passage extends from the air inlet opening to the air mixing chamber. A second air flow passage extends from a downstream part of the first air flow passage to the air mixing chamber. A third air flow passage extends downstream from the air mixing chamber. An evaporator is installed in an upstream part of the first air flow passage for cooling air passing therethrough. A heater core is installed in the second air flow passage for warming air passing therethrough. A mix door is arranged to control the proportion between the amount of air directly led to the mixing chamber from the first air flow passage and the amount of air directed to the second air flow passage from the first air flow passage. A ventilation door is arranged to control the proportion between the amount of air directed from the air mixing chamber to the air inlet opening and the amount of air directed from the air mixing chamber toward the third air passage. The evaporator and the heater core are arranged generally in parallel with each other and arranged to define therebetween an upstream portion of the first air flow passage.

11 Claims, 3 Drawing Sheets

HEATER/COOLER UNIT OF AUTOMOTIVE AIR CONDITIONING DEVICE

BACKGROUND OF THE INVENTION

1. Field of the Invention

The present invention relates in general to an automotive air conditioning device, and more particularly to a heater/cooler unit of the air conditioning device, which is usually mounted under an instrument panel of the vehicle. More specifically, the present invention is concerned with a heater/cooler unit which, irrespective of a compact construction thereof, can feed the passenger room with a sufficiently cooled air in a full-cooling mode.

2. Description of the Prior Art

In order to clarify the task of the present invention, one conventional heater/cooler unit of an automotive air conditioning device will be described with reference to FIG. 6 of the accompanying drawings.

The conventional heater/cooler unit 100 comprises a casing 110 which has an air inlet opening 112 which is connected to an air intake unit "IU".

The air intake unit "IU" comprises a blower chamber 114 in which an electric blower 116 is operatively installed. An outside air inlet passage 118 and an inside air inlet passage 120 are connected to the blower chamber 114. A flow rate control door 122 is arranged to adjust the proportion between the open degree of the outside air inlet passage 118 and that of the inside air inlet passage 120. In the illustrated condition, the inside air inlet passage 120 is fully closed and the outside air inlet passage 118 is fully opened. Thus, in this case, upon energization of the blower 116, only outside fresh air is forcibly led into the casing 110 through the blower chamber 114.

Within an upstream part of the casing 110, there is installed an evaporator 124 which cools air passing therethrough. Within a middle lower part of the casing 110, there is installed an inclined heater core 126 which heats air passing therethrough. In front of the heater core 126, there is installed a mix door 128 which controls the amount of air directed to the heater core 126. With these parts, the casing 110 has a cooled air passage "CP", a heated air passage "HP" and an air mixing chamber "MC" defined therein. That is, the cooled air passage "CP" extends directly from the evaporator 124 to the mixing chamber "MC", and the heated air passage "HP" extends from a rear face of the heater core 126 to the mixing chamber "MC".

A ventilation opening 130 is formed in a downstream end of the casing 110, through which conditioned air to be blown to an upper portion of a passenger room passes. The ventilation opening 130 has a ventilation door 132 pivotally connected thereto. Designated by numeral 134 is a defroster opening through which cooled air to be blown to an inner surface of a windshield passes, and designated by numeral 136 is a foot space opening through which warmed air to be blown to a lower portion of the passenger room passes. These openings 134 and 136 have a defroster door 138 and a foot space door 140 respectively.

When, in the illustrated condition, the blower 116 is operated, air is forced to flow in the casing 110 in a manner as is indicated by solid line arrows and led into a passenger room (not shown) through the ventilation opening 130.

However, due to inherent construction, the above-mentioned conventional heater/cooler unit 100 has the following drawbacks.

First, the unit 100 is bulky in construction because the evaporator 124 and the heater core 126 are arranged in the casing 110 without considering the space saving which is needed particularly in case of compact cars.

Second, the unit 100 fails to exhibit a satisfactory operation in a full-cooling mode. That is, in the full-cooling mode, the mix door 128 assumes the illustrated full-closed position to fully block the heater core 126, and the ventilation door 132 assumes the illustrated full-open position to fully open the ventilation opening 130. However, under this condition, due to nature of air, before being led to the ventilation opening 130, part of air in the mixing chamber "MC" is directed toward the heater core 126, heated there and returned to the mixing chamber "MC", as is indicated by a broken line arrow. In this case, the cooled air having been directly led to the ventilation opening 130 from the evaporator 124 through the cooled air passage "CP" is heated or at least warmed by the loitering heated air. In order to eliminate such drawback, various measures have been hitherto proposed, one being a measure of using a separate damper door which, as is described in Japanese Patent First Provisional Publication 56-8,712, blocks the heated air passage "HP" in the full-cooling mode, and the other being a measure of using a shut valve which, in the full-cooling mode, shuts the supply of hot water (viz., engine cooling water) to the heater core 126. However, even these measures have failed to exhibit a satisfactory result.

SUMMARY OF THE INVENTION

It is therefore an object of the present invention to provide a heater/cooler unit of an automotive air conditioning device, which is free of the above-mentioned drawbacks.

According to a first aspect of the present invention, there is provided a heater/cooler unit of an automotive air conditioning device, which comprises a casing having air inlet and outlet openings formed therein, the air outlet opening being the opening through which conditioned air to be blown to a passenger room passes; means defining in the casing an air mixing chamber located just upstream of the air outlet opening; means defining in the casing a first air flow passage which extends from the air inlet opening to the air mixing chamber; means defining in the casing a second air flow passage which extends from a downstream part of the first air flow passage to the air mixing chamber; means defining in the casing a third air flow passage which extends downstream from the air mixing chamber; an evaporator installed in an upstream part of the first air flow passage for cooling air passing therethrough; a heater core installed in the second air flow passage for warming air passing therethrough; a mix door arranged to control the proportion between the amount of air directly led to the mixing chamber from the first air flow passage and the amount of air directed to the second air flow passage from the first air flow passage; and a ventilation door arranged to control the proportion between the amount of air directed from the air mixing chamber to the air inlet opening and the amount of air directed from the air mixing chamber toward the third air passage, wherein the evaporator and the heater core are arranged generally in parallel with each other and arranged to define therebetween an upstream portion of the first air flow passage.

According to a second aspect of the present invention, there is provided a heater/cooler unit of an automotive air conditioning device, which comprises a casing having air inlet and outlet openings formed therein, the air outlet opening being the opening through which conditioned air to be blown to a passenger room passes; means defining in the casing an air mixing chamber located just upstream of the air outlet opening; means defining in the casing a first air flow passage which extends from the air inlet opening to the air mixing chamber; means defining in the casing a second air flow passage which extends from a downstream part of the first air flow passage to the air mixing chamber; an evaporator installed in an upstream pat of the first air flow passage for cooling air passing therethrough; a heater core installed in the second air flow passage for warming air passing therethrough; a mix door arranged to control the proportion between the amount of air directly led to the mixing camber from the first air flow passage and the amount of air directed to the second air flow passage; and a ventilation door arranged to control the open degree of the air outlet opening, wherein the ventilation door is arranged to partially block the communication between a downstream part of the second air flow passage and the mixing chamber when assuming a position to fully open the air outlet opening.

According to a third aspect of the present invention, there is provided a heater/cooler unit of an automotive air conditioning device, which comprises a casing having air inlet and outlet openings which are connected through an air flow passage; an evaporator installed in the air flow passage; a heater unit installed in the air flow passage at a position downstream of the evaporator, the heater unit being positioned above the evaporator; a partition wall by which the air flow passage is particles defined, the partition wall being arranged between the evaporator and the heater core to define an air inlet passage which extends from the air inlet opening to a front face of the evaporator.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Figure 1:
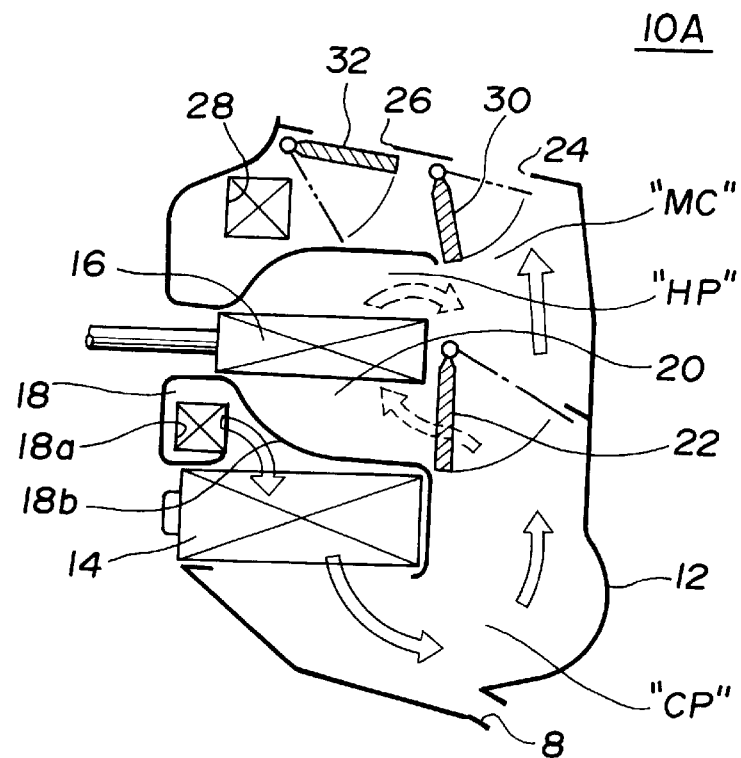
FIG. 1 is a sectional view of a heater/cooler unit which is a first embodiment of the present invention.

Referring to FIG. 1, there is shown a heater/cooler unit 10A of a first embodiment of the present invention.

The unit 10A comprises a casing 12 which, when assembled in a vehicle, is positioned in front of a passenger room assuming the illustrated posture wherein the upper part (that is the part where parts 24, 30, 26 and 32 are provided) of the casing 12 as viewed in the drawing is positioned at the uppermost place. Within the casing 12, there are installed an evaporator 14 and a heater core 16 which are arranged horizontally and in parallel with each other. As shown, the heater core 16 is positioned above the evaporator 14. The evaporator 14, for cooling air passing therethrough, receives the cold, low pressure and atomized liquid refrigerant from a thermostatic expansion valve (not shown), and the heater core 16, for heating air passing therethrough, receives the heated water from a water jacket of an engine (not shown).

The casing 12 has at a position above the evaporator 14 an air inlet chamber 18 which has an air inlet opening 18a connected to an air intake unit (not shown). A partition wall 18b defines an air inlet passage which extends from the air inlet chamber 18 to a front face of the evaporator 14.

Figure 6:
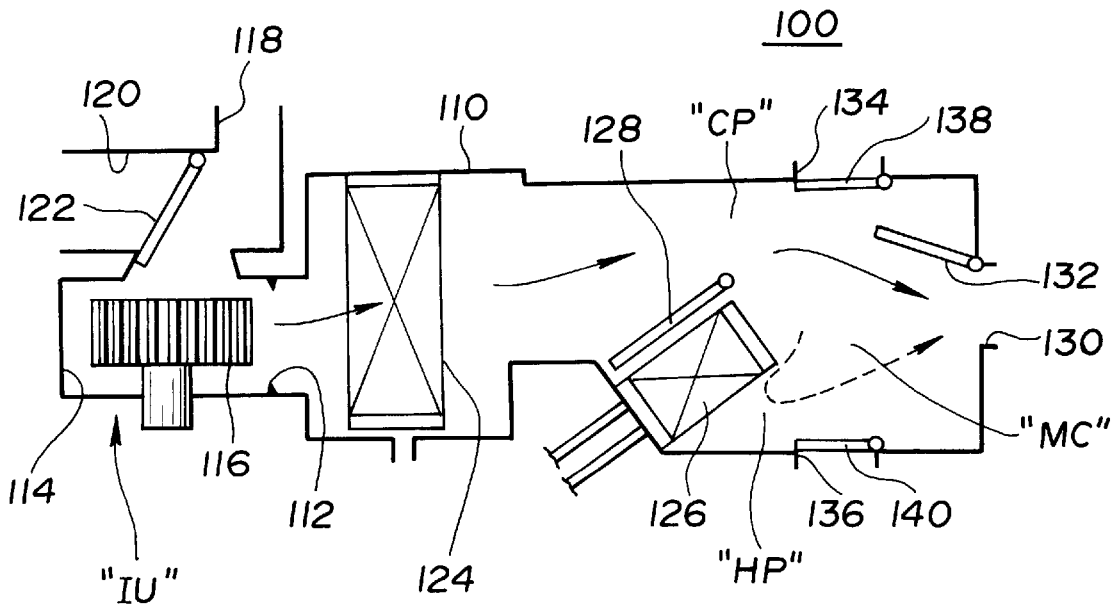
FIG. 6 is a sectional view of a conventional heater/cooler unit of an automotive air conditioning device.

The air intake unit has substantially the same construction as the above-mentioned air intake unit "IU" (see FIG. 6). That is, both outside air and inside air can be led into the air inlet chamber 18 through the air intake unit.

The air in the air inlet chamber 18 passes through the evaporator 14 and comes to a lower part of a cooled air passage "CP", or a first air flow passage and turns upward there, as is indicated by solid line arrows.

A heater core inlet passage 20 is defined in the casing 12, which extends from a downstream part of the cooled air passage "CP" (or a first air flow passage) to a front face of the heater core 16. At the downstream part of the cooled air passage "CP", there is pivotally installed a mix door 22 which can control the amount of air directed to the heater core 16. A heated air passage "HP" is defined in the casing 12, which extends from a rear face of the heater core 16 to a mixing chamber "MC" which is defined at a terminal end portion of the cooled air passage "CP". A second air flow passage is defined by the combination of the heated air passage "HP" and the heater core inlet passage 20. Thus, it will be appreciated that the mix door 22 can control the proportion between air amount directly led to the mixing chamber "MC" and air amount directed to the heater core 16.

At a downstream part of the mixing chamber "MC", there are defined three openings, which are a ventilation opening 24 through which conditioned air to be blown to an upper portion of the passenger room passes, a defroster opening 26 through which conditioned air to be blown to an inner surface of a windshield passes, and a foot space opening 28 through which conditioned air to be blown to a lower portion of the passenger room passes. In fact, ducts (not shown) extend from the foot space opening 28 to the lower portion for conveying warm air to warm feet of passengers. The ventilation opening 24 and the defroster opening 26 have control doors 30 and 32 for controlling the open degree of the openings 24 and 26 respectively. For ease of understanding, the control doors 30 and 32 will be referred to as a ventilation door 30 and a defroster door 32 in the following. Although not shown in the drawing, also the foot space opening 28 has a control door. A third air flow passage is defined between the mixing chamber "MC" and the three above-mentioned openings.

The casing 12 is formed at a lower portion thereof with a drain port 8.

The mix door 22 is linked to a control lever (not shown) which is arranged in a control panel and manually operated by a driver. In place of the manual operation, the mix door 22 may be moved by an actuator which is electrically controlled by the control lever. In a full-cooling mode of the unit 10A, the mix door 22 fully closes the heater core inlet passage 20 while fully opening the cooled air passage "CP", while, in a full hot mode, the mix door 22 fully opens the heater core inlet passage 20 while fully closing the cooled air passage "CP".

When the mix door 22 assumes an intermediate position, part of the cooled air from the evaporator 14 is directly led to the mixing chamber "MC" as is indicated by solid line arrows, and the other part of the cooled air from the evaporator 14 is directed toward the heater core 16 and led to the mixing chamber "MC" after being warmed by the heater core 16, as is indicated by broken line arrows. Thus, in the mixing chamber "MC", the cooled air and the warmed air are mixed to provide conditioned air of a desired temperature which is fed to the passenger room.

The ventilation door 30, the defroster door 32 and the foot space door of the foot space opening 28 are linked to a blow mode lever (not shown) which is arranged also in the control panel. That is, when a ventilation mode is selected by the blow mode lever, only the ventilation door 30 is opened. While, a bi-level mode is selected, the ventilation door 30 and the foot space door are opened and the defroster door 32 is closed.

In the following, advantages of the heater/cooler unit 10A of the first embodiment will be described.

Since the evaporator 14 and the heater core 16 are arranged horizontally in parallel with each other and a space defined therebetween is used as the air inlet passage, the unit 10A can be constructed compact in size. That is, space saving is practically carried out in the unit 10A.

In the full-cooling mode, the mix door 22 fully opens the cooled air passage "CP" and the ventilation door 30 fully opens the ventilation opening 24 as is shown in FIG. 1. In this mode, a straight passage for the cooled air is provided, which includes the cooled air passage "CP" and the mixing chamber "MC". That is, in this mode, the sufficiently cooled air from the evaporator 14 can be smoothly led to the ventilation opening 24 after turning upward at the lower portion of the cooled air passage "CP". A so-called speedy cooling of the passenger room is thus achieved.

Due to provision of the drain port 8, condensed water from the evaporator 14 can be easily discharged to the outside of the casing 12.

Figure 2:
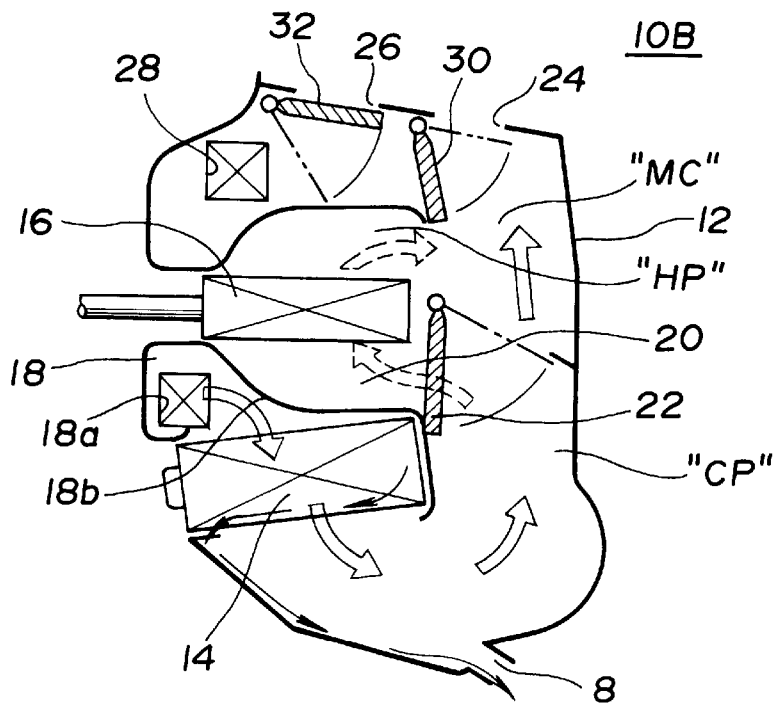
FIG. 2 is a view similar to FIG. 1, but showing a second embodiment of the present invention.

Referring to FIG. 2, there is shown a heater/cooler unit 10B of a second embodiment of the present invention.

Since the unit 10B of this embodiment is similar to the above-mentioned first embodiment 10A, only portions which are different from those of the first embodiment will be described in detail in the following for ease of description.

In this second embodiment 10B, the evaporator 14 is somewhat inclined. Preferably, the inclination angle of the evaporator 14 relative to a horizontal flat surface (not shown) is about 5° to about 20°.

With the inclined arrangement of the evaporator 14, discharging of the condensed water of the evaporator 14 through the drain port 8 is much easily carried out as is shown by solid arrows.

Figure 3:
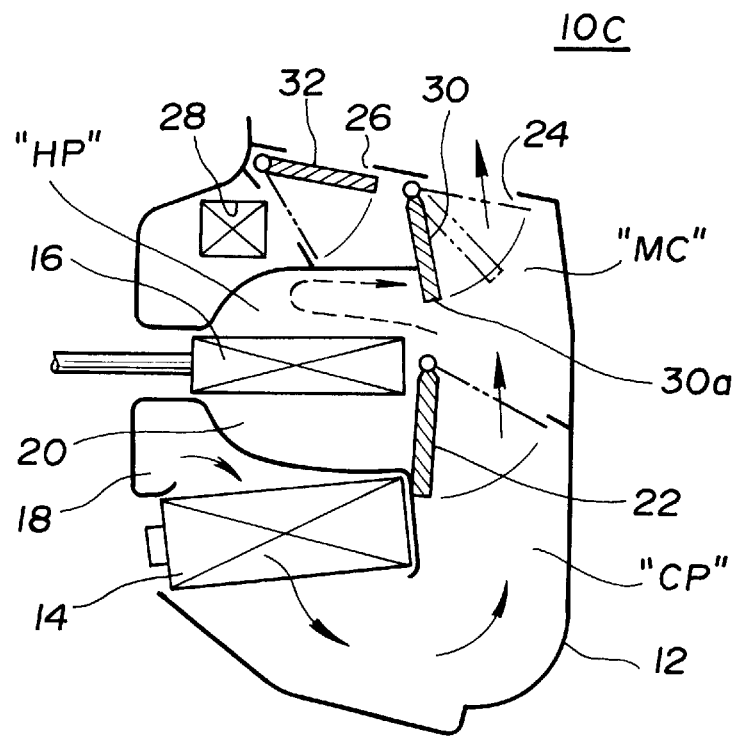
FIG. 3 is a view similar to FIG. 1, but showing a third embodiment of the present invention.

Referring to FIG. 3, there is shown a heater/cooler unit 10C of a third embodiment of the present invention.

Since the unit 10C of this embodiment is similar to the above-mentioned first embodiment 10A, only portions which are different from those of the first embodiment 10A will be described.

As is shown in the drawing, the ventilation door 30 of this third embodiment 10C is longer than the door 30 of the above-mentioned first embodiment 10A.

When assuming the illustrated full-open position, the ventilation door 30 can partially block at a leading end portion 30a thereof the communication between the heated air passage "HP" and the mixing chamber "MC". That is, in the full-open position, the leading end portion 30a of the ventilation door 30 projects into a junction part defined between the heated air passage "HP" and the mixing chamber "MC". Furthermore, in the full-open position, the ventilation door 30 can serve as a guide means which smoothly guides the air in the mixing chamber "MC" toward the ventilation opening 24. That is, in such a full-open position, the control door 30 is so postured or inclined as to extend in parallel with the direction along which the air flows toward the ventilation opening 24 through the mixing chamber "MC".

In the full-cooling mode of the unit 10C, the mix door 22 fully opens the cooled air passage "CP" (that is, fully closes the heater core inlet passage 20) and the ventilation door 30 fully opens the ventilation opening 24, as shown. Thus, under this condition, the air which has been sufficiently cooled by the evaporator 14 is permitted to flow in a manner as is indicated by solid line arrows and blown into the upper portion of the passenger room through the ventilation opening 24. Thus, similar to the case of the above-mentioned conventional unit 100 of FIG. 6, loitering part of air in the mixing chamber "MC" is directed toward the heater core 16 through the heated air passage "HP", as is indicated by a broken line arrow.

However, as has been mentioned hereinabove, according to the third embodiment 10C of the invention, in such a full-open position, the ventilation door 30 partially blocks the communication between the heated air passage "HP" and the mixing chamber "MC". Thus, the loitering air warmed by the heater core 16 is blocked from smoothly returning to the mixing chamber "MC". Furthermore, due to the air guide function possessed by the ventilation door 30 in the full-open position, the undesired loitering flow of air toward the heated air passage "HP" from the cooled air passage "CP" is minimized. Thus, the sufficiently cooled air from the evaporator 14 is prevented from being affected or warmed by the loitering warmed air. That is, the heater/cooler unit 10C of this third embodiment can exhibit a satisfactory operation in the full-cooling mode.

In addition to the above, the heater/cooler unit 10C of the third embodiment has the following advantages.

Because the ventilation door 30 is arranged to serve as a so-called multi-function door, the unit 10C can be constructed much compact in size and low in cost. In fact, there is no need of using a separate damper door and/or a shut valve, which would be used in the above-mentioned conventional heater/cooler units.

Partial blocking of the heated air passage "HP" means a partial communication between the heated air passage "HP" and the mixing chamber "MC". Thus, when the mix door 22 assumes a position to open the heater core inlet passage 20, the air passing through the passage 20 and the heater core 16 can be led to the mixing chamber "MC" through the heated air passage "HP". This brings about an appropriate mixing in the mixing chamber "MC" between heated air from the heater core 16 and cooled air from the evaporator 14, in a mode other than the full-cooling mode.

The heater/cooler unit 10C can exhibit a satisfactory function also in a so-called bi-level mode wherein cooled air is blown to the upper portion of the passenger room through the ventilation opening 24 and warmed air is blown to the lower portion of the passenger room through the foot space opening 28. That is, in such bi-level mode, the ventilation door 30 can be opened halfway, the defroster door 32 is fully closed, the control door (not shown) of the foot space opening halfway 28 is opened and the mix door 22 is halfway opened. Thus, cooled air flow from the evaporator 14 is divided by the partially opened mix door 22 into two flows, one being a flow directed toward the mixing chamber "MC" and a flow directed to the heater core 16. The cooled air flow directed to the mixing chamber "MC" is blown to the upper portion of the passenger room through the partially opened ventilation opening 24. While, the air flow directed to the heater core 16 is heated or warmed when passing through the same and directed toward the mixing chamber "MC". Because, in this condition, the ventilation door 30 has the leading end portion 30a deeply projected into the mixing chamber "MC" as is shown by a broken line, major part of the warmed air flow from the heater core 16 is reflected by the leading end toward the foot space opening 28. Thus, the warmed air is blown to the lower part of the passenger room through the partially opened foot space opening 28. Thus, in this bi-level mode, the head of each passenger can be kept relatively cool and the feet can be kept relatively warm, which provides the passengers with comfortable feeling.

Figure 4:
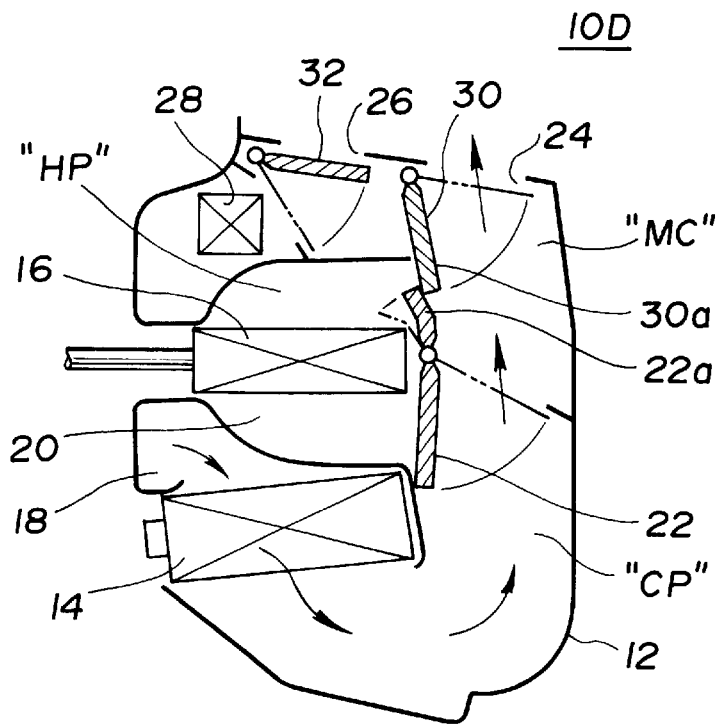
FIG. 4 is a view similar to FIG. 1, but showing a fourth embodiment of the present invention.

Referring to FIG. 4, there is shown a heater/cooler unit 10D of a fourth embodiment of the present invention.

Since the unit 10D of this fourth embodiment is similar to the above-mentioned unit 10C of the third embodiment, only parts and constructions which are different from those of the third embodiment 10C will be described in detail in the following for ease of description.

As shown in FIG. 4, in this fourth embodiment 10B, the mix door 22 has an extension part 22a integrally connected thereto. That is, a so-called butterfly door is employed, which includes the mix door 22 and the extension part 22a. If desired, the extension part 22a may be bent toward the heater core 16.

As shown in the drawing, when, with the ventilation door 30 assuming the full-open position, the mix door 22 fully closes the heater core inlet passage 20, the extension part 22a contacts the leading end portion 30a of the ventilation door 30.

That is, in the full-cooling mode of the heater/cooler unit 10D, the communication between the heated air passage "HP" and the mixing chamber "MC" is completely blocked by the leading end portion 30a of the ventilation door 30 and the extension part 22a of the mix door 22. Thus, in this fourth embodiment 10B, the sufficiently cooled air from the evaporator 14 can be much effectively fed to the upper portion of the passenger room through the ventilation opening 24 in the full-cooling mode.

As is understood from the drawing, when the mix door 22 is pivoted to open the heater core inlet passage 20, the extension part 22a is simultaneously moved to partially open the communication between the heated air passage "HP" and the mixing chamber "MC". In this case, the air having been warmed when passing through the heater core 16 can be led into the mixing chamber "MC" to mix with the sufficiently cooled air from the evaporator 14, and thus, conditioned air can be fed to the upper portion of the passenger room through the ventilation opening 24.

In the bi-level mode wherein both the ventilation door 30 and the mix door 22 are opened halfway, the leading end portion 30a of the ventilation door 30 is deeply projected into the mixing chamber "MC" and the extension part 22a of the mix door 22 is projected into the heated air passage "HP". Thus, a major part of the warmed air flow from the heater core 16 is more effectively led to the foot space opening 28, and thus, more warmed air can be blown to the lower part of the passenger room.

Figure 5:
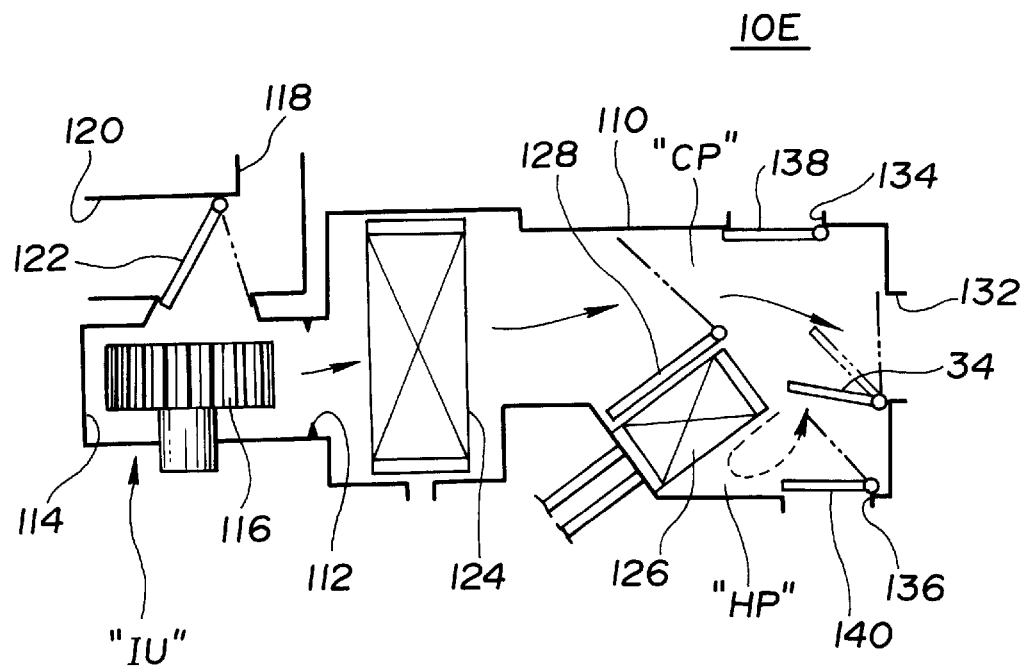
FIG. 5 is a sectional of a heater/cooler unit which is a fifth embodiment of the present invention.

Referring to FIG. 5, there is shown a heater/cooler unit 10E of a fifth embodiment of the present invention.

Since the unit 10E of this fifth embodiment is similar to the above-mentioned conventional unit 100 of FIG. 6, only parts which are different from those of the conventional one will be described for ease of description. Similar parts are designated by the same numerals.

As shown in FIG. 5, in this fifth embodiment 10E, the ventilation opening 132 has a uniquely arranged ventilation door 34. That is, when assuming a full-open position, the ventilation door 34 can partially block the communication between the heated air passage "HP" and the mixing chamber "MC". For achieving this function, the ventilation door 34 is hinged to a lower portion of the ventilation opening 132, which is near the heater core 126 as shown.

In the full-cooling mode of the heater/cooler unit 10E, the communication between the heated air passage "HP" and the mixing chamber "MC" is partially blocked by the ventilation door 34, and thus, the loitering air warmed by the heater core 126 is suppressed from smoothly returning to the mixing chamber "MC". Thus, the sufficiently cooled air from the evaporator 124 is protected from being affected or warmed by the loitering warmed air, and thus the sufficiently cooled air from the evaporator 124 can be effectively led to the upper portion of the passenger room through the ventilation opening 132.

In the bi-level mode wherein both the ventilation door 34 and the mix door 128 are opened halfway, the leading end portion of the ventilation door 34 is deeply projected into the mixing chamber "MC" as is shown by a broken line, which promotes the flow of cooled air from the evaporator 124 into the ventilation opening 132 as well as the flow of warmed air from the heater core 126 into the foot space opening 136.

What is claimed is:

1. A heater/cooler unit of an automotive air conditioning device, comprising:

a casing having air inlet and outlet openings formed therein, said air outlet opening being the opening through which conditioned air to be blown to a passenger room passes;

means defining in said casing an air mixing chamber located just upstream of said air outlet opening;

means defining in said casing a first air flow passage which extends from said air inlet opening to said air mixing chamber;

means defining in said casing a second air flow passage which extends from a downstream part of said first air flow passage to said air mixing chamber;

means defining in said casing a third air flow passage which extends downstream from said air mixing chamber;

an evaporator installed in an upstream part of said first air flow passage for cooling air passing therethrough;

a heater core installed in said second air flow passage for warming air passing therethrough;

a mix door arranged to control the proportion between the amount of air directly led to the mixing chamber from said first air flow passage and the amount of air directed to said second air flow passage from said first air flow passage; and a ventilation door arranged to control the proportion between the amount of air directed from said air mixing chamber to said air outlet opening and the amount of air directed from said air mixing chamber toward said third air passage, wherein said evaporator and said heater core are arranged generally in parallel with each other and arranged to define therebetween an upstream portion of said first air flow passage containing air that has not yet passed through the evaporator and an upstream portion of said second air flow passage.

2. A heater/cooler unit as claimed in claim 1, in which said first air flow passage is curved to have a lower portion at which cooled air from the evaporator is turned upward toward the air outlet opening.

3. A heater/cooler unit as claimed in claim 2, in which said heater core is positioned above said evaporator.

4. A heater/cooler unit as claimed in claim 3, in which said casing is formed at a lower portion thereof with a drain port through which condensed water from an external surface of said evaporator is discharged to the outside.

5. A heater/cooler unit as claimed in claim 4, in which said evaporator is slightly inclined with respect to said heater core.

6. A heater/cooler unit as claimed in claim 1, further comprising:
- means defining in said casing a defroster opening through which air to be blown to an inner surface of a windshield passes, said defroster opening being exposed to said third air flow passage; and
- means defining in said casing a foot space opening through which air to be blown to a lower part of the passenger room passes, said foot space opening being exposed to said third air flow passage.

7. A heater/cooler unit as claimed in claim 1, in which said ventilation door is so arranged and shaped as to partially block the communication between a downstream part of said second air flow passage and said mixing chamber when assuming a given position to fully open said air outlet opening.

8. A heater/cooler unit as claimed in claim 7, in which said ventilation door has a leading end portion which is projected into a junction part between the downstream part of said second air flow passage and said mixing chamber when said ventilation door assumes said given position.

9. A heater/cooler unit as claimed in claim 8, in which said mix door has an extension part which fully blocks said communication in cooperation with said ventilation door when said mix door assumes a given position to fully close said second air flow passage.

10. A heater/cooler unit as claimed in claim 9, in which, when, with said ventilation door assuming said given position, said mix door assumes the position to fully close said second air flow passage, said extension part of said mix door contacts the leading end portion of said ventilation door.

11. A heater/cooler unit as claimed in claim 1, further comprising a partition wall disposed between the evaporator and the heater core, whereby the partition wall defines an air inlet passage which extends from said air inlet opening to a front face of said evaporator.

* * * * *